United States Patent [19]

Musil

[11] Patent Number: 4,620,271
[45] Date of Patent: Oct. 28, 1986

[54] CIRCUIT ARRANGEMENT FOR FEEDING ELECTRICAL USERS VIA A SWITCH CONTROLLER

[75] Inventor: Gerhard Musil, Munich, Fed. Rep. of Germany

[73] Assignee: Siemens Aktiengesellschaft, Berlin & Munich, Fed. Rep. of Germany

[21] Appl. No.: 753,115

[22] Filed: Jul. 9, 1985

[30] Foreign Application Priority Data

Jul. 13, 1984 [DE] Fed. Rep. of Germany ....... 3425903

[51] Int. Cl.[4] .......................................... H02M 3/335
[52] U.S. Cl. ........................................ 363/21; 363/56;
363/97; 323/222
[58] Field of Search ........................ 363/15, 19, 21, 25,
363/56, 97; 323/222; 361/18, 93

[56] References Cited

U.S. PATENT DOCUMENTS

| | | | |
|---|---|---|---|
| 4,245,285 | 1/1981 | Weiss | 323/222 X |
| 4,330,816 | 5/1982 | Imazeki et al. | 363/21 X |
| 4,415,960 | 11/1983 | Clark, Jr. | 363/21 |

FOREIGN PATENT DOCUMENTS 3221404 12/1983 Fed. Rep. of Germany .

OTHER PUBLICATIONS

U.S. Ser. No. 546,122, filed 10/27/83.

Primary Examiner—Patrick R. Salce
Assistant Examiner—Emanuel Todd Voeltz
Attorney, Agent, or Firm—Hill, Van Santen, Steadman & Simpson

[57] ABSTRACT

In a circuit arrangement for feeding electrical users with a DC voltage, a constant-current fed switch controller is followed by a voltage converter. Given such a circuit arrangement, difficulties can arise when users are fed which, given a change of the input voltage, take a constant power, as is the case given voltage converters having a regulated output voltage. In order to make the circuit arrangement as insensitive as possible to overload conditions, the circuit arrangement is provided with a device for limiting the input power of the voltage converter. The circuit arrangement can be employed with particular advantage for feeding intermediate locations in communications transmission devices.

7 Claims, 3 Drawing Figures

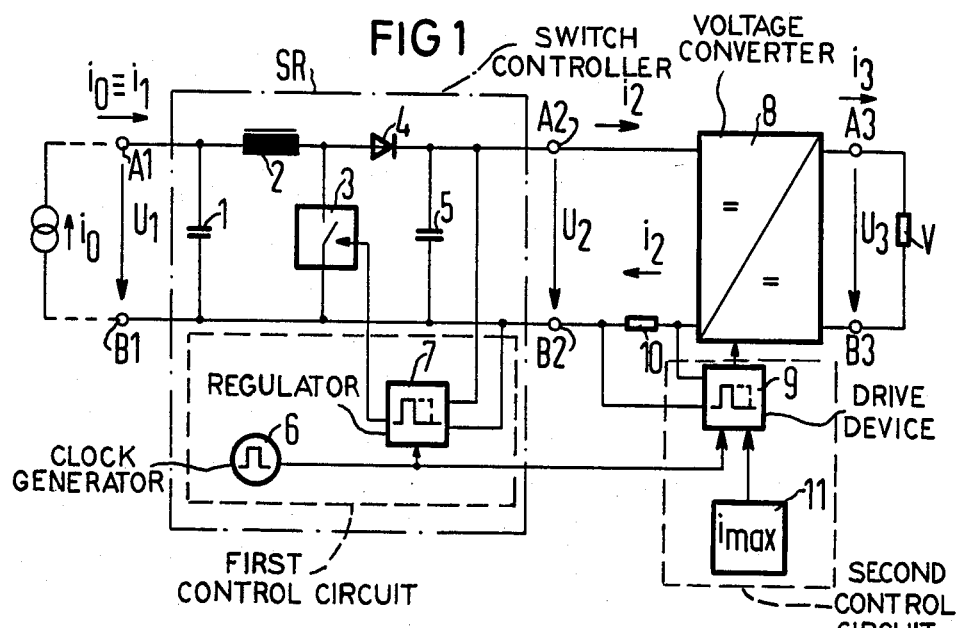
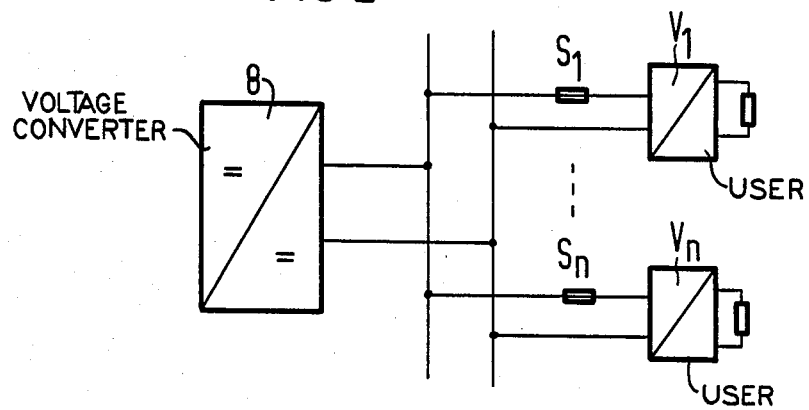

CIRCUIT ARRANGEMENT FOR FEEDING ELECTRICAL USERS VIA A SWITCH CONTROLLER

RELATED APPLICATIONS

This application is related to the following applications of the same assignee: "Circuit Arrangement For Feeding Electrical Users", Musil, U.S. Ser. No. 753,108; and "Circuit Arrangement For Feeding Electrical Users With a DC Voltage", Musil, U.S. Ser. No. 753,127.

BACKGROUND OF THE INVENTION

The invention relates to a circuit arrangement for feeding electrical users with a DC voltage wherein at least one user is connected via a switch controller to a feed circuit fed with an impressed current. The switch controller contains a switch element controllable by a control circuit dependent on the DC voltage directly fed to the user or fed to the user via a voltage converter.

Such a circuit arrangement is already disclosed in German OS No. 32 42 023, incorporated herein by reference.

The known circuit arrangement serves the purpose of remotely feeding electrical users, whereby the remote feed current held constant is first converted into a constant voltage in the circuit arrangement preceding the user, and then is transformed in potential-separated fashion to the desired user voltage. Since the circuit arrangement can match its input voltage to the respectively required power, it functions in a very low-loss manner. When the circuit arrangement is overloaded at the user side, then the input voltage drops, as does the possible power consumption. The circuit arrangement is thus comparatively secure against damage due to too high a load.

Investigations in the framework of the invention, however, have shown that it is desirable in some cases to bridge a possible overload at a certain time with maximum power output. Such a situation particularly exists when the circuit arrangement has a plurality of outputs and users operating at these outputs which have a constant power consumption given changing voltage. Under such pre-conditions, a power-wise overload at one of the outputs can lead to a general collapse of the output voltage. When, as a consequence, the user which caused the overload is disconnected from the output allocated to it, then the other users, none-the-less, take increased current at the voltage which is then reduced. When the input voltage of the circuit arrangement has dropped in the meantime, then the increased current can no longer be output under certain conditions, although the sum of the power is lower than that which the circuit arrangement can output as a maximum during operation. In this fashion, the output voltage can finally collapse so that the circuit arrangement can no longer operate the users which are still intact per se.

On the other hand, it can occur in special cases given a circuit arrangement of the type initially cited that the input voltage is boosted to such an extent due to an overload at the output, that the constant current source switches into a voltage limiting condition, and the input current of the DC-DC converter drops. This can lead to stability problems, or to the disconnection of the constant current source.

SUMMARY OF THE INVENTION

It is an object of the invention to design the circuit arrangement of the type initially cited such that it is as insensitive as possible to overload conditions.

In particular, it should be in a position to automatically change into the normal operating condition following an overload condition.

In accordance with the invention, the circuit arrangement for achieving this object is designed so as to provide a current sensor means for sensing feed current of the voltage converter means. The voltage converter means is controllable by the current sensing means and by a second control circuit means connected to the current sensor means such that it emits a reduced output voltage given a feed current of the voltage converter means above a prescribed limit value of the feed current.

The advantage results based on the techniques of the invention that the circuit arrangement is particularly universally useful and is particularly also useful for feeding users having at least an approximately constant power consumption.

When the circuit arrangement is designed such that the prescribed limit value of the current is lower than the remote feed current, then it results that the switch controller always remains in the switch mode so that a particularly stable operating condition follows.

According to an embodiment of the invention, a reduction of the output voltage due to a change of the pulse-duty factor or repetition frequency of the control pulses of the otherwise preferably unregulated voltage converter is provided.

In a further development of the circuit arrangement, the voltage converter has no means for charge storage at its input, or when the current sensor is an additional winding in the transformer contained in the voltage converter.

In another development of the circuit arrangement, a comparator emits pulses having a prescribed duration. The duration can thus be constant and can be prescribed by the desired conversion ratio. On the other hand, the duration can be somewhat varied particularly to a relatively limited scope, by a device for regulating the output voltage U3, by a compensating circuit, or the like.

BRIEF DESCRIPTION OF THE DRAWINGS

FIG. 1 is a circuit arrangement comprising a switch controller and a voltage converter with automatic limitation of the input power;

FIG. 2 is a circuit arrangement comprising a plurality of individually protected voltage converters as users.

DESCRIPTION OF THE PREFERRED EMBODIMENTS

Figure 3:
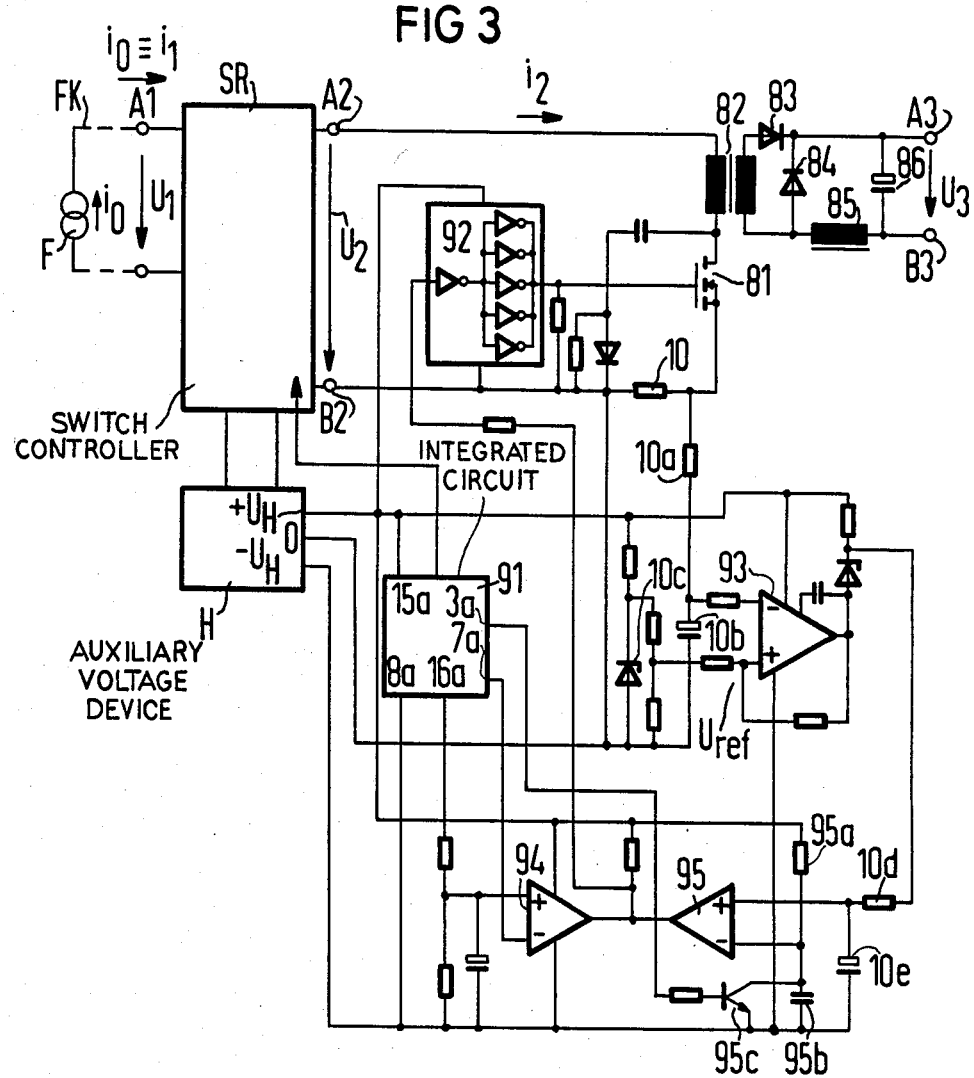
FIG. 3 is a circuit arrangement comprising a switch controller and a voltage converter having a field effect transistor as a switch element.

The circuit arrangement shown in FIG. 1 is a constant current-fed DC-DC converter which generates a constant, potential-separated voltage for a variable load. It preferably serves as a converter in devices for the remote feed of intermediate locations of a communications transmission means by use of DC series feed.

The converter contains a correspondingly controlled switch controller SR designed as an inductor converter which converts a variably picked-up input voltage U1 into a stabilized voltage U2. The voltage U2 is selected such that it is somewhat higher than the input voltage U1 allocated to the maximum power. The output voltage U3 is generated in potential-separated fashion from the stabilized voltage U2 by the voltage converter 8 following thereupon designed as a flow converter. In the switch controller SR, the capacitor 1 is positioned parallel to the input and the capacitor 5 is positioned parallel to the output. The capacitors 1 and 5 and the switch element 3 are connected in unipolar manner to one another. The capacitors 1 and 5 are connected at the side facing away from this junction via a series connection comprising the inductor 2 and the diode 4, whereby the inductor 2 is at the input and the diode 4 is poled such that it is transmissive for currents from the input to the output. The switch element 3 is positioned in a shunt arm of the switch controller between the junction of inductor 2 and diode 4 on the one hand, and the junction of the capacitors 1 and 5 on the other hand.

The switch controller SR forms the actual current-voltage converter. The capacitor 1 is small in comparison to the capacitor 5 lying at the output of the switch controller.

The semiconductor switch is opened and closed by a pulse-width-modulated signal such that energy from the remote feed circuit and from the energy stored in the inductor 2 and the input capacitor 1 is conducted via the diode 4 to the output capacitor 5 in precisely such an amount that a voltage at the latter remains constant as long as a specific, maximum load current which can at most be equal to the remote feed current $I_0$ at this location is not exceeded. The control of the pulse-width modulated signal occurs in the same fashion as in known inductor converters.

It is practical when the load current $I_2$ of the switch controller SR is always lower than the current $I_1$, or the remote feed current $I_0$ of the same size, since the switch 3 then always operates in a switch mode, and thus unchanging operating conditions prevail. The voltage U2 is then always greater than the value of the voltage U1 allocated to the maximum power. Due to the constant voltage at its input, the DC converter following the switch controller can be designed in a simple fashion according to one of the known principles. It is preferably an uncontrolled flow converter with a separator transformer. Its clock frequency is advantageously taken from the same clock generator 6 which also drives the switch controller SR.

From the signal emitted from the clock generator 6, the drive device 9 outputs a pulse sequence which controls the power switch (not shown in FIG. 1) situated in the converter 8 with corresponding control signals. Under a given condition, at least one signal existing in the clock generator 6, or in the regulator 7, can be also employed in generating the control signals.

The converter 8 can also be equipped with its own clock generator which functions independently of the clock generator 6, or is synchronized with it. An arrangement which is particularly simple to realize results given an arrangement as shown in FIG. 1 comprising a common clock generator 6.

In case of overload, the switch controller SR reacts such that its input voltage U1 is reduced. Accordingly, however, a temporary overload causes a collapse of the input voltage U1. This is prevented when the voltage converter 8 following the switch controller SR is designed with a device for power limitation. The cut-in point of the power limitation lies below the maximum power consumption possible for this voltage converter. Since, in the operating case, the voltage U2, which is held constant in practice, is always present at the input of the voltage converter 8. This suffices for monitoring picked-up current at this location and for influencing the behavior of the voltage converter in such fashion that a defined, maximum value of the input current of the converter 8 cannot be exceeded.

The current $I_2$ is now converted into a proportional voltage drop in a resistor 10 and is supplied to the drive device 9. This voltage drop is compared in a known fashion in the drive device 9 to a reference voltage which is supplied from the limit value generator 11. When the comparison shows that the limit value of the current is reached or exceeded, then the pulse-duty factor of the pulse sequence output by the drive device 9 is modified such that the converter 8 outputs a reduced voltage U3.

When the converter 8 does not have a capacitor at its input, then the current $I_2$ flows in pulse-like fashion. The voltage drop at the resistor 10 is then smoothed in a suitable way, particularly by an RC circuit.

The current $I_2$ can be acquired in some other way. In particular, an additional winding of the transformer present in voltage converter 8 can be employed as a current sensor.

Due to the limitation of the input current of the voltage converter 8 it results that, given a possible overload at the output side, the output voltage U3 is reduced and, at the same time, a boosted current is offered to the user, which is voltageboosted in accordance with the output power which is kept constant. Either a stable condition is then re-established or the overload is eliminated by means of suitable techniques, and the user is then brought back with the then adequate current to the original voltage for which the circuit arrangement is dimensioned.

It can also be practical to internally limit the pulse-duty factor of the switch controller SR. The maximum possible power output of the switch controller SR in the switch mode of the switch 3 is thus achieved, in any case. Moreover, given a possible malfunction of the switch means 8 through 11, or at the limits of the range of stabilization of the drive means 9, it is thus guaranteed that the switch controller SR cannot be overloaded. When the maximum power output of the switch controller SR defined in such fashion is reached and possibly exceeded, then the input voltage U1 of the circuit arrangement is reduced and a static current limitation is not required.

It is essential that the picked-up power of the voltage converter 8 lies below the maximum power which is emittable by the preceding current-voltage converter SR. This is then limited on its own in accordance with the pulse-duty factor such that the switch 3 is closed for a certain time during every period, and the overall converter SR encounters unvarying operating conditions.

A favorable dynamic behavior is produced when the limit power, as a consequence of the current limitation of $I_2$, is placed only slightly below the limit of the maximum power which the switch controller SR is capable of emitting.

Instead of one user V, a plurality of users can also be connected to the output or to the outputs. FIG. 2 shows such an arrangement.

When, in accordance with FIG. 2, a plurality of users V1 ... Vn is connected to the voltage converter 8, then the remaining users can be brought back to the original voltage after the elimination of the overload, for example due to response of one of the fuses S1 ... Sn.

The user causing the overload can be easily disconnected since it takes an elevated current which causes the fuse to respond. Even converters which take an increased current given an undervoltage condition can be supplied as load circuits by the circuit arrangement.

FIG. 3 shows further details of a preferred embodiment of the circuit arrangement of FIG. 1. The current-voltage converter SR generates a voltage U2 of 340 V between its output terminals A2 through B2, this voltage U2 being governed to a constant value. The switch controller SR takes the power required for this purpose from the remote feed circuit FK and outputs a current $I_0$ of 0.4 A which is held constant. The input voltage U1 is matched to the respectively required output power by a regulating means. The switch controller SR contains the integrated circuit 91 of the type SG 3524 J which encompasses the function of the clock generator 6 and of the drive device 7 of FIG. 1, and which is shown outside of the switch controller SR in FIG. 2 in order to be able to better show its function in the control of the flow converter forming the voltage converter 8.

The circuit arrangement also contains a device H for generating auxiliary voltages. To distinguish them from reference characters, the terminal designations of the integrated circuit 91 are respectively augmented by an "a". The circuit 91 emits a stabilized reference voltage of 5 V at its terminal 16a, emits narrow pulses of a level of about 3 V at terminal 3a in the rhythm of the clock frequency, and emits a saw tooth pulse train of the same frequency at terminal 7a, this pulse train respectively running up from about 1 V to about 3.5 V.

The terminals are also employed in terms of their functions for the drive of the switch controller SR. A threshold voltage is derived from the reference voltage at terminal 16a, this threshold voltage being compared to the saw tooth pulse train by the comparator 94. A rectangular pulse train having a fixed pulse-duty factor thus arises in a simple fashion at the output of the comparator 94, this rectangular pulse train switching the power field effect transistor 81 of the voltage converter 8 designed as a flow converter via the drive module 92. The flow converter contains the diodes 83 and 84, the inductor 85, and the capacitor 86, and generates the DC voltage U3 at output A3, B3 in a known way. During normal operation, the DC voltage U3 is at least approximately constant since the voltage converter is fed with a constant voltage U2.

The device 91 which comprises the function of the clock generator 6 and of the regulator 7 emits, among other things, a saw-tooth shaped voltage at its terminal 7a which is periodic at the clock frequency. This is directly supplied to the drive device 9. The part thereof which provides the pulse sequence having the fixed pulse-duty factor for loads for which the load limitation is not yet effective, can thus be constructed in a particularly simple fashion.

For the purpose of limiting the power output by the switch controller SR at its output side, the current $I_2$ flowing in pulse-like fashion is acquired at resistor 10 which has a value of, for example, 2 ohms, and serves as a current sensor. The mean value of the voltage drop at the resistor 10 is formed in the RC element 10a, 10b. The mean value is supplied to the inverting input of the operational amplifier 93. The operational amplifier 93 compares the voltage at the capacitor 10b to the reference voltage $U_{ref}$ derived from the voltage drop at the Z-diode 10c. The output voltage of the operational amplifier 93, which greatly shifts from the value $+U_H = 12$ V to the value $-U_H = -2$ V when the prescribed maximum value of the current $I_2$ is exceeded, forms via the RC element 10d, 10e, the threshold voltage of the comparator 95 with some delay. A non-linear saw-tooth voltage is supplied to the inverting input of the comparator 95.

The saw-tooth voltage is generated by a periodic charging of the capacitor 95b by the resistor 95a and discharging by the transistor 95c, which is driven by the terminal 3 of the switch control circuit 91.

Since the comparators 94 and 95 have an open collector output, the two outputs of the comparator 94 and 95 form an OR logic. The pulse-width which is the determining factor for the output of this OR logic is always defined by the comparator, which allows the narrower positive pulses. With simple means, thus an unmediated transition from constant pulse-duty factor to pulse-width-modulated pulse-duty factor is created. Another possibility is in the known shifting of a threshold.

The Zener diode immediately at the output of the controlled-gain amplifier 93 prevents too great a reduction of the threshold and limits the possible modification in the width of the pulses driving the voltage converter 8. When the load at the output A3, B3 is further increased, then the limitation of the current $I_2$ established by the dimensioning of the switch controller SR is effective as is, and thus the maximum power consumption of the circuit arrangement as well. The initially cited collapse of input voltage U1 and of the output power occurs. Thus, on the one hand, it results that the output current and, on the other hand, the amplitude of the current pulses in the switch element 81 can never achieve values which could lead to damage in the circuit arrangement.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement for feeding electrical users with a DC voltage, comprising:
   at least one user connected via a switch controller means to a feed circuit fed with an impressed current;
   said switch controller means having a switch element controllable with switch pulses produced by a first control circuit means dependent on a DC voltage at its output;
   said switch controller means maintaining said DC voltage at its output at least approximately constant;
   the switch element being connected parallel to an input of the switch controller means;
   a diode between the switch element and a capacitor connected parallel to an output of the switch controller means;
   said diode being poled such that the diode is inhibited given a conductive switch element;
   a voltage converter means connected between an output of the switch controller means and said at least one user;
   a current sensor means for sensing feed current of the voltage converter means;

the voltage converter means being controllable by said current sensing means and by a second control circuit means connected to said current sensor means such that is emits a reduced output voltage given a feed current of the voltage converter means above a prescribed limit value of the feed current; and said prescribed limit value of the feed current being lower than said impressed current.

2. A circuit arrangement according to claim 1 wherein said voltage converter means contains at least one switch element controlled by switch pulses of said second control circuit means; and said second control circuit means containing means for modification of a duration and/or of a repetition frequency of the switch pulses as a function of an output quantity of the current sensor means.

3. A circuit arrangement according to claim 1 wherein said switch controller means is provided with means for limiting a pulse-duty factor of switch pulses.

4. A circuit arrangement according to claim 1 wherein the second control circuit means provided for control of said voltage converter means contains two comparators which have their outputs combined as an OR logic, one of the comparators being controlled such that it emits pulses having a prescribed pulse-width and the other comparator being controlled by a voltage output of said current sensor means such that it emits width-modulated pulses.

5. A circuit arrangement according to claim 1 wherein said circuit arrangement comprises a remote feed of intermediate locations of a communications transmission device.

6. A circuit arrangement for feeding electrical users with a DC voltage, comprising:
at least one user connected via a switch controller means to a feed circuit fed with a substantially constant impressed current;
said switch controller means having a switch element controllable with switch pulses produced by a first control circuit means dependent on a DC voltage fed to the user;
said switch controller means maintaining said DC voltage to be fed to the user at least approximately constant;
the switch element being connected parallel to an input of the switch controller means;
a diode between the switch element and a capacitor connected parallel to an output of the switch controller means;
said diode being poled such that the diode is inhibited given a conductive switch element;
a voltage converter means connected between the output of the switch controller means and said at least one user;
a current sensor means for sensing feed current of the voltage converter means;
the voltage converter means being controllable by said current sensing means and by a second control circuit means connected to said current sensor means such that it emits a reduced output voltage given a feed current of the voltage converter means above a prescribed limit value of the feed current; and
said prescribed limit value of the feed current being lower than said impressed constant current.

7. A circuit arrangement for feeding electrical users with a DC voltage, comprising:
at least one user connected via a switch controller means to a feed circuit fed with an impressed current;
said switch controller means having a switch element controllable with switch pulses produced by a first control circuit means dependent on a DC voltage at its output;
said switch controller means maintaining said DC voltage at its output at least approximately constant;
the switch element being connected parallel to an input of the switch controller means;
a diode between the switch element and a capacitor connected parallel to an output of the switch controller means;
said diode being poled such that the diode is inhibited given a conductive switch element;
a voltage converter means connected between an output of the switch controller means and said at least one user;
a current sensor means for sensing feed current of the voltage converter means;
the voltage converter means being controllable by said current sensing means and by a second control circuit means connected to said current sensor means such that it emits a reduced output voltage given a feed current of the voltage converter means above a prescribed limit value of the feed current; and
the second control circuit means provided for control of said voltage converter means containing two comparators which have their outputs combined as an OR logic, one of the comparators being controlled such that is emits pulses having a prescribed pulse-width and the other comparator being controlled by a voltage output of said current sensor means such that it emits width-modulated pulses.

* * * * *